3,321,365
ACARICIDAL METHOD
Julius J. Menn, San Jose, Calif., and Walter A. Stamm, Tarrytown, N.Y., assignors to Stauffer Chemical Company, New York, N.Y., a corporation of Delaware
No Drawing. Filed Apr. 6, 1964, Ser. No. 357,750
6 Claims. (Cl. 167—30)

This invention relates to a class of organotin-containing pesticides and a method for utilizing the same.

In particular, this invention relates to compounds which provide new and valuable properties. These compounds have been found to be useful and particularly effective against mite organisms belonging to the class acarina. The term mites is used herein to include both mites and ticks, which are related biologically and both are included in the taxonomy acarina. This invention is, therefore, also concerned with acaricidal compositions having the aforementioned organotin compounds as active components therein.

Mites are a serious problem in agriculture and horticulture. Mites are widely distributed throughout the world, and in the United States they are known to attack a wide variety of horticultural and agricultural plants, and poultry and livestock. Few other pests cause greater damage to so wide a range of hosts as do mites.

As might be expected, a considerable assortment of parasiticidal materials have been suggested and investigated for the control of mite organisms. Among the organic biocides found effective in controlling a great variety of pest organisms are the organophosphorus compounds. The organophosphorus esters have proven exceptionally effective for destroying insects. Several of the commercial insecticides which are currently being manufactured and employed for this purpose include, as the toxic ingredient, one or more of the organophosphorus esters. Although the newly developed insecticides give excellent protection against insects, certain other pest organisms have proved more difficult to control. For example, certain species of the phytophagous mites of the class acarina have exhibited an unusual degree of resistance to many of the commonly used insecticides. It is also known that certain organisms are capable of developing resistance to certain classes of insecticides and acaricides; especially to be noted here are the organophosphorus materials. Therefore, there exists a continuing search for new materials to control the aforesaid pests wherein satisfactory control will be realized.

It has been discovered that certain organotin compounds are especially effective in the control of acarids and the provision of a method for combating said pests organisms by means of certain organotin compounds constitutes the principal object of the invention. Yet further objects will become apparent throughout the balance of the invention.

The compounds encompassed by the embodiment of the present invention are trialkyl tin compounds which may be represented by the formula

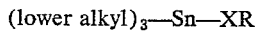

wherein the lower alkyl groups contain from 1 to 6 carbon atoms, inclusive, X is selected from the group consisting of oxygen and sulfur, R is selected from the group consisting of phenyl, naphthyl, quinolyl, and substituted phenyl, naphthyl and quinolyl groups, wherein said substituents are halogen, hydroxyl, alkoxyl, alkyl, haloalkyl, amino, alkylamino and nitro groups.

The preparation of the organic tin compounds, the acaricidal utility of which is herein contemplated, is well known in the chemical arts. According to G. S. Sasin, J. Org. Chem., 18 1142 (1953), trialkyltin phenolates and trialkyltin thiophenolates may be easily prepared. As an example, the trialkyltin arenolates and thioarenolates are generally prepared by cleaving a bis(trialkyltin) oxide with the requisite acidic material, either an arenol or thioarenol. One mole of the bis(trialkyltin)oxide and two equivalents of the acid are heated together in the presence of a relatively inert liquid organic solvent. There is obtained two moles of the trialkyltin arenolate or thioarenolate which can be isolated in the usual manner. Thus using the appropriate bis(trialkyltin)oxide and the appropriate acidic material, as given above, the compounds of the present invention may be prepared.

In practicing the present invention any of the various techniques or methods can be employed for contacting the mites with the toxic organotin compound. For example, spray formulations can be prepared by dissolving the organotin compound in suitable organic solvents such as toluene, xylene, benzene and the like, and subsequent dispersion of this solution in water in the presence of a surface acting wetting or emulsifying agent. Another method by which the acaricidal agents of the present invention can be applied is in the form of a dispersible powder, preferably as homogeneous free-flowing dusts commonly formulated by mixing the active component with finely divided solids or carriers such as talc, natural clays, diatomaceous earth, various flours such as walnut shell, wheat and the like. The details of compounding and applications are well known to those versed in the art.

The compounds of the present invention were tested as acaricides according to the following method.

*Acaricidal evaluation test.*—The two-spotted mite, *Tetranychus telarius* (Linn.), was employed in tests for acaricidal activity. Young pinto bean plants in the primary leaf stage were used as host plants. The young pinto bean plants were infested with several hundred mites. Dispersions of the candidate materials were prepared by dissolving 0.1 gram in 10 ml. of a suitable solvent, usually acetone. Aliquots of the toxicant solutions were suspended in water containing 0.0175% v/v. Sponto 221, a commercial emulsifying agent. The amount of water used was sufficient to give concentrations of active ingredient ranging from 0.25% to 0.0005%. The test suspensions were then sprayed on the infested pinto bean plants. After seven days mortality of post-embryonic and egg forms were determined. The percentage of kill was determined by comparison with control plants which had not been sprayed with the candidate compounds. The LC–50 value was calculated using well-known procedures. The LC–50 values are reported under columns PE (Post-embryonic) and E (Eggs) in the table below.

TABLE.—ACARICIDAL ACTIVITY (LOWER ALKYL)₃—Sn—X—R

| Lower alkyl | X—R | Two-spotted mite (LC-50) | |
|---|---|---|---|
| | | PE | E |
| n-Butyl | Pentachlorophenolate | .005 | .01 |
| Do | Pentabromophenolate | .003 | .005 |
| Do | 2-chloro-4-fluorophenolate | .01 | .03 |
| Do | 4-nitrophenolate | .01 | .01 |
| Do | 2-chloro-4-nitrophenolate | .005 | .01 |
| Do | 4-chloro-2-nitrophenolate | .005 | .01 |
| Do | 2,6-dibromo-4-nitrophenolate | .005 | .005 |
| Do | 2-aminophenolate | .03 | .03 |
| Do | 3-trifluoromethylphenolate | .01 | .03 |
| Do | 2,6-dimethylphenolate | .03 | |
| Do | 3-methyl-4-chlorophenolate | .001 | .008 |
| Do | 2,6-dimethyl-4-bromophenolate | .03 | .03 |
| Do | 2,3,5,6-tetramethyl-4-bromophenolate | .01 | >.1 |
| Do | 3,dimethylaminophenolate | .05 | .05 |
| Do | 4-methyl-2-nitrophenolate | .005 | .03 |
| Do | 2,6-dipropylphenolate | .03 | .03 |
| Do | Pentachlorothiophenolate | .001 | .01 |
| Do | 2,aminothiophenolate | .001 | .01 |
| Do | 2-(Δ²-butenyl) phenolate | <.01 | .01 |
| Do | Naphtholate | .005 | .005 |
| Do | Thionaphtholate | .003 | .005 |
| Do | 4-benzyloxyphenolate | .003 | .007 |
| Do | 8-quinolinolate | .001 | .003 |
| Do | 5,7-dichloro-8-quinolinolate | .01 | .03 |
| i-Butyl | 2,4,5-trichlorophenolate | .005 | .01 |
| Do | 3-methyl-4-chlorophenolate | .01 | .01 |
| Do | 4-chlorothiophenolate | >.1 | >.1 |
| Do | 2-aminothiophenolate | .01 | >.01 |
| Do | Pentachlorothiophenolate | .005 | .005 |

Various changes and modifications may be made without departing from the spirit and scope of the invention described herein as will be apparent to those skilled in the art to which it pertains. It is accordingly intended that the present invention shall only be limited by the scope of the appended claims.

We claim:

1. The method of controlling acarids comprising applying thereto an effective amount of a compound of the formula (lower alkyl)₃—Sn—X—R wherein the lower alkyl groups contain from 1 to 6 carbon atoms, inclusive, X is selected from the group consisting of oxygen and sulfur, R is selected from the group consisting of phenyl, naphthyl, quinolyl and substituted phenyl, naphthyl and quinolyl groups, wherein said substituents are halogen, hydroxyl, alkoxyl, alkyl, haloalkyl, amino, alkylamino and nitro groups.

2. The method of controlling acarids comprising applying thereto an effective amount of the compound tri-n-butyltin pentabromophenolate.

3. The method of controlling acarids comprising applying thereto an effective amount of the compound tri-n-butyltin 3-methyl-4-chlorophenolate.

4. The method of controlling acarids comprising applying thereto an effective amount of the compound tri-n-butyltin naphtholate.

5. The method of controlling acarids comprising applying thereto an effective amount of the compound tri-n-butyltin thionaphtholate.

6. The method of controlling acarids comprising applying thereto an effective amount of the compound tri-n-butyltin 8-quinolinolate.

References Cited by the Examiner

UNITED STATES PATENTS

| | | | |
|---|---|---|---|
| 3,037,039 | 5/1962 | Mauzur | 260—429.7 |
| 3,070,615 | 12/1962 | Seyferth | 260—429.7 |
| 3,095,434 | 6/1963 | Stamm et al. | 260—429.7 |
| 3,099,668 | 7/1963 | Zweigle et al. | 260—429.7 |
| 3,105,000 | 9/1963 | Hardy | 167—22 |
| 3,113,144 | 12/1963 | Zweigle | 260—429.7 |
| 3,117,146 | 1/1964 | Zweigle et al. | 260—429.7 |
| 3,117,147 | 1/1964 | Langer | 260—429.7 |
| 3,122,576 | 2/1964 | Jason et al. | 260—429.7 |
| 3,129,236 | 4/1964 | Weissenberger | 260—429.7 |
| 3,152,156 | 10/1964 | Mageli et al. | 260—429.7 |

LEWIS GOTTS, *Primary Examiner.*

SHEP K. ROSE, *Assistant Examiner.*